INVENTOR:
WILLIAM L. FREEMAN

United States Patent Office 3,538,288
Patented Nov. 3, 1970

3,538,288
CABLE SEVERING BY ELECTRO-THERMAL MEANS

William L. Freeman, Roy, Utah, assignor to Thiokol Chemical Corporation, Bristol, Pa., a corporation of Delaware
Filed May 27, 1968, Ser. No. 732,347
Int. Cl. B23k 11/22
U.S. Cl. 219—68                                    8 Claims

ABSTRACT OF THE DISCLOSURE

A device for releasing or separating a cable under tension by electrically heating a portion thereof within an insulating body. Electrical energy is supplied to a pair of terminals in the body from an external source and thence to a portion of the cable contacting the terminals. The cable thereby becomes heated and eventually separates as a result.

---

This invention relates to the art of cable separating, cutting or releasing and the like. More particularly it relates to a device for cutting or separating cables which are usually under tension wherein electric current supplied from an external source is caused to flow through a portion of the cable enclosed within an insulating body between two or more spaced terminals causing it to become heated. Heating of the cable portion in turn results in softening of the material of the cable and eventual separation thereof.

Prior art devices for accomplishing the above referred to result have usually involved either mechanically operated knives, cutting blades or the like, forcutting the cables; or explosive charges, such as the so-called shaped charge which severs the cable by directing a high temperature explosive gas against a portion of the cable at the point of desired separation. While the above devices have been widely used, and in most instances succesfully so, their use has been somewhat restricted due to undesirable complexities inherent in the former, and the inherently potential danger involved both to personnel and equipment by use of the latter. And further, when used to separate a cable at a remote location, mechanical cutters and knives must also incorporate some additional mechanism such as a pressure operated cylinder and associated valving in order to separate the cable at the desired place and time. Explosively actuated separators on the other hand, are potentially dangerous, presenting handling problems, and even though precautions against premature actuation are relatively simple to incorporate within a given system, such precautions are necessary, and therefore add to system overall complexity. And since either system usually requires electrical equipment of some kind, either for control or actuation, it is advantageous to eliminate as many parts from a system as possible, both to improve reliability of the system as well as to reduce cost and undesired weight, the latter being an important factor in missiles and aircraft.

Accordingly, it is an important object of this invention to provide a device for separating cables to effect release thereof from its attachment means wherein said separation is effected by direct application of electrical power.

It is a further object of this invention to provide a device for separating cables wherein a portion of the cable is included within an insulating body and is electrically contacted by a pair of spaced apart terminals therein for effecting heating of the cable portion by electric current directed thereto from an external source.

Other objects and features will become more apparent and more fully understood from the following description and the accompanying drawings in which.

Figure 1:
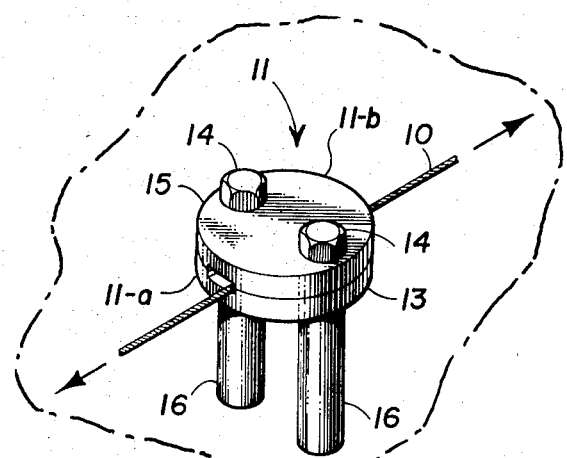
FIG. 1 is a pictorial, isometric view of the invention having a cable passing therethrough.

Referring to the drawings and in particular to FIG. 1, there is shown in its preferred embodiment a device 11 comprising a cable 10 of steel or the like, passing through an opening 11a in a body or housing 11b, formed between the two separable parts 13 and 15 and held together by any means, such as a pair of through bolts 14. Housing 11b is separated from its surrounding or support structure, shown generally by the continuous broken line in FIG. 1 (which may be an aircraft, missile or other structure in which the invention may be use) by standoff sleeves or bushings 16.

Figure 2:
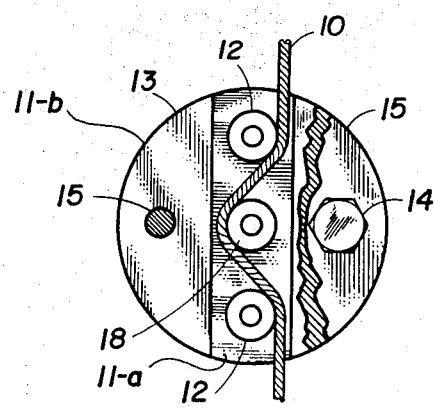
FIG. 2 is a top view, partially sectioned, illustrating the position of a portion of a cable.
Figure 4:
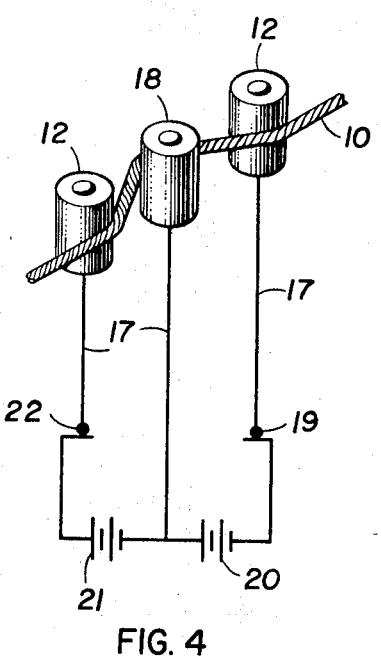
FIG. 4 is an electrical schematic showing the electrical circuitry and exemplary associated switching in a preferred embodiment of the invention.
Figure 3:
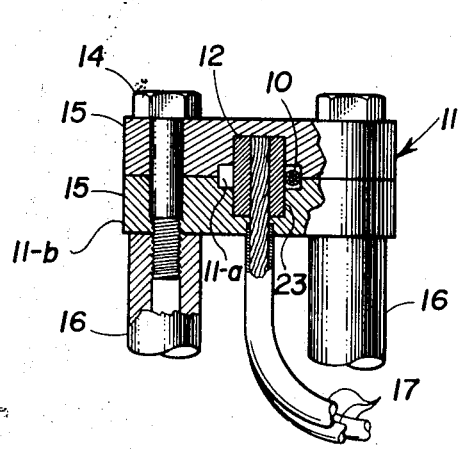
FIG. 3 is an elevation of the invention, partially sectioned, illustrative of the electrical connections therein.

FIG. 2 shows housing 11b with top half or part 15 partially broken away to expose bottom half 13, opening 11a and a pair of spaced apart electrical terminals, or posts 12. A center post, or terminal 18 is also provided and cable 10 passes around these terminals as shown. Counterbores 23 (one shown in FIG. 3) formed in each of parts 15 and 13 receive terminals 12 and 18 to maintain a spaced apart relationship therebetween. An electric current supply lead 17 connects with each of terminals 12 and 18 by soldering, or other well known means, and to insure a good electrical connection of cable 10 with terminals 12 and 18, cable 10 passes therearound (as shown in FIG. 2 and FIG. 4). FIG. 4 illustrates an electrical circuit wherein a pair of switches 19 and 22 control the flow of current from two electrical sources, or batteries 20 and 21 respectively, which together with leads 17, terminals 12 and 18 provide a redundant circuit. Where a redundant circuit is deemed unnecessary or undesirable, one of contacts or terminals 12 with its associated circuitry can be eliminated.

Material selected for housing or body 11b and upper and lower parts or halves 15 and 13 is a temperature resistant electrical insulator such as a ceramic, a phenolic compound, or plastic, or tetrafluorethylene, preferably the latter. Terminals 12 and 18 are preferably brass or copper, though any conducting material will suffice. Cable 10 is usually metallic such as steel, copper or stainless steel depending upon its use.

Figure 5:
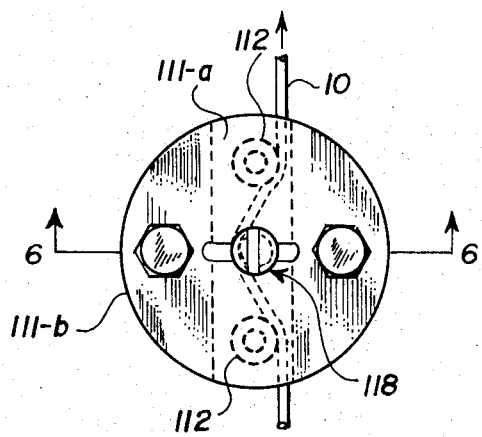
FIG. 5 is a top view of an other embodiment of the invention.
Figure 6:
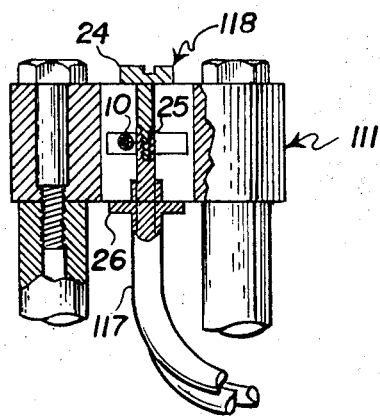
FIG. 6 is an elevational section of the invention of FIG. 5 taken line 6—6.

FIGS. 5 and 6 are illustrative of an additional embodiment of the invention wherein the body or housing 111b is a single, integral piece having an opening 111a formed therein, as in the preferred embodiment. However, in this embodiment of the center terminals 118 is movable (left or right in FIG. 5), being comprised of a contact screw 24 which is turned down into the threaded end 25 of its associated electrical lead 117. Lead 117 is fitted with ferrule or collar 26 to limit its upward movement as screw 24 is tightened in end 25 thereof. By this means, good electrical contact between the terminals 112, 118 and cable 10 again ensured as it is only necessary to thread cable 10 through opening 111a with terminal 118 in its extreme right (or left) hand position after which it is moved to the left (or right) against cable 10 and thereafter tightened by means of a screwdriver or other suitable tool.

In the practical utilization of this invention consider the problem of a spinning body, such as a missile or space vehicle in flight which is to be stopped in its spinning motion within a predetermined time period (usually quite short). A method for accomplishing this in recent years has been to transfer the spinning or rotational energy of this body or vehicle to a pair of released weights which are attached to the opposite ends of a cable such as cable 10. A second cable is attached to each weight and then wrapped around a portion of the vehicle, called a "de-spin module," and as the weights are released, or deployed, by the action of severing cable 10 they move outwardly on an involute path while the second cable unwraps. The weights thus centrifugally loaded, transmit this load through the second pair of cables to the vehicle and apply a torque thereto counteracting its spinning motion, which counteracting torque decreases the rate of spinning to some intermediate speed, or zero. At an appropriate preselected time for initiating the de-spin function, switches, such as switches 19 and 22, are closed as by a timer actuated relay or the like (not shown) and current flows through the circuit and in the portion of cable 10 between terminals 12 and 18. The current thus flowing causes a heating of the cable 10 thereat and eventually melts it, or causes it to be sufficiently weakened to separate. Thus it is seen that by judicious application of the device of this invention, de-spin module weights can be simultaneously released by the simple, reliable and direct application of electrical energy to a cable. Further, it can be seen that what applicant has herein presented and for which he pays exclusive rights in the practice thereof in a Letters Patent in accordance with the law governing such things, is a unique cable release or separating device which operates from the direct application of electrical energy, thereby obviating the use of complex mechanical gadgetry or dangerous explosives as was heretofore the case.

Having described a preferred and an additional embodiment of the invention, and given a preferred end use thereof, it should not be construed to be solely limited thereto, as many more uses can and will occur to persons skilled in the art of cable separation and release. Accordingly, the only limitations to be imposed on the scope of this invention are set forth in the below-listed claims.

What is claimed is:

1. A cable separating device comprising:
   an electrically non-conductive body;
   a pair of spaced apart electrical terminals contacting said cable in said body adapted to be connected to an external electrical power source;
   means comprising an additional terminal in said body positioned substantially in-line with and between said spaced apart terminals and in contact with said cable;
   means defining an opening in said body for passing said cable thereinto to make contact with said spaced apart and said additional terminals;
   and means for controlling the supply of electric power supplied to said terminals, said cable being heated thereby until separation.

2. A device for thermally separating a cable wherein at least a portion of the cable is positioned within the device so as to form part of an electrical circuit comprising, an electrically insulating body enclosing at least a portion of said cable, at least a pair of spaced apart electric terminals in said body disposed therein so as to electrically contact said cable portion; means comprising an additional terminal in said body disposed between said spaced apart terminals and contacting said cable portion in said body; and means for conducting an electric current from an external power source to said terminals whereby said cable becomes heated and thereafter separated.

3. The invention of claim 1 wherein said body is separable into a pair of parts adapted to be joined together so as to define a transverse opening for passing said cable therethrough and having spaced apart counterbores for holding said terminals stationary.

4. The invention of claim 1 wherein at least one of said terminals is movable in said body for maintaining electrical contact between said cable and said terminals.

5. The invention of claim 1 wherein said means for conducting electric current to said terminals is a redundant electric circuit including an additional terminal in said body, said additional terminal being a common, electrical connector for applying said current between said remaining terminals through said cable and said redundant circuit.

6. The device of claim 2, wherein said cable portion in said body is in contact with said spaced apart terminals on substantially the same side thereof and in contact with said additional terminal on a side opposite to the side of contact with said spaced apart terminals for increasing tension in said cable and effect more efficient separation thereof upon heating.

7. The invention of claim 2 further including means on said body for laterally moving said additional terminal for strengthening electrical contact between said cable and said spaced apart terminals.

8. A cable separating device comprising an electrically insulated body, at least a pair of spaced apart electrical terminals in said body disposed therein so as to contact said cable within said body, means for conducting an electrical current from an external power source to said terminals and through said cable comprising, a redundant electric circuit including an additional terminal in said body, said additional terminal being a common electrical connector for applying said current between said remaining terminals, through said cable, and said redundant circuit.

References Cited
UNITED STATES PATENTS

| | | | |
|---|---|---|---|
| 2,667,557 | 1/1954 | Herzog | 219—68 |
| 2,706,231 | 4/1955 | Tyler et al. | 219—68 |
| 3,431,384 | 3/1969 | Cooper | 219—68 |

RALPH F. STAUBLY, Primary Examiner